No. 722,804. PATENTED MAR. 17, 1903.
E. I. BRADDOCK.
COMPOSITE TIRE FOR WHEELS.
APPLICATION FILED JUNE 14, 1902.
NO MODEL.

Witnesses.
C. H. Gannett
J. Murphy

Inventor.
Edward I. Braddock,
by Jas. H. Churchill
atty.

UNITED STATES PATENT OFFICE.

EDWARD I. BRADDOCK, OF WINCHESTER, MASSACHUSETTS.

COMPOSITE TIRE FOR WHEELS.

SPECIFICATION forming part of Letters Patent No. 722,804, dated March 17, 1903.

Application filed June 14, 1902. Serial No. 111,611. (No model.)

*To all whom it may concern:*

Be it known that I, EDWARD I. BRADDOCK, a citizen of the United States, residing in Winchester, in the county of Middlesex and State of Massachusetts, have invented an Improvement in Composite Tires for Wheels, of which the following description, in connection with the accompanying drawings, is a specification, like letters on the drawings representing like parts.

This invention relates to a wheel, and more particularly to the rim or tire of the same, and has for its object to provide a novel tire or rim with which the traction of the wheel may be increased.

The invention is adapted, among other uses, to be embodied in a wheel employed on vehicles designed to carry heavy loads, whereby the traction of the wheels on streets which are paved or which have smooth or slippery surfaces is increased, so as to reduce to a minimum the slipping of the wheels, thereby enabling the vehicle to be drawn over such surfaces with a minimum power. For this purpose I provide the wheel with a tire or rim of iron or steel having a wearing or gripping surface of softer metal—such as lead, tin, zinc, and the like or alloys of the same, which gripping-surface is molecularly united to the iron or steel portion of the rim or tire. These and other features of this invention will be pointed out in the claims at the end of this specification.

Figure 1:
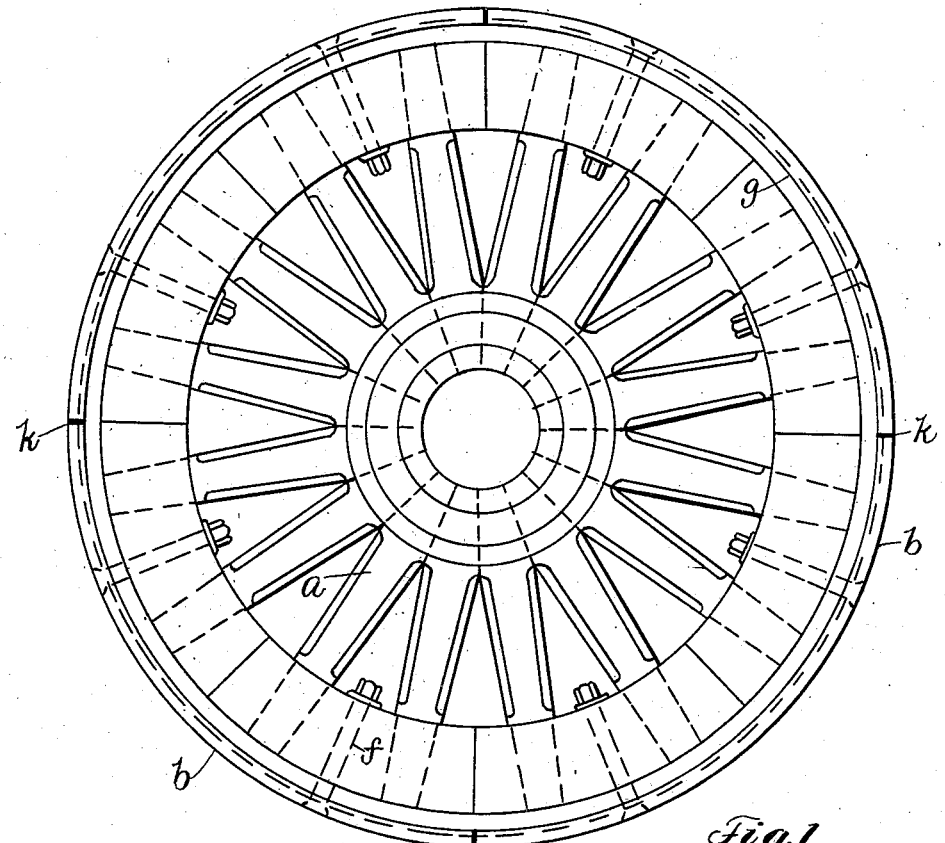
Figure 2:
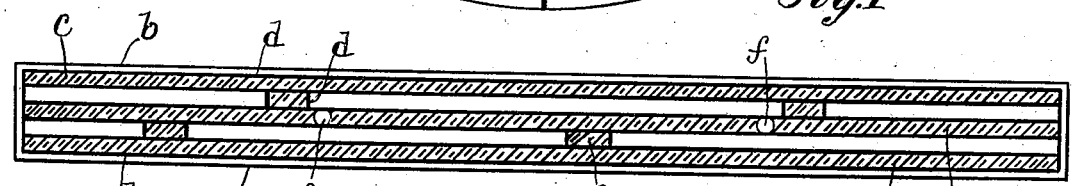
Figures 3, 4:
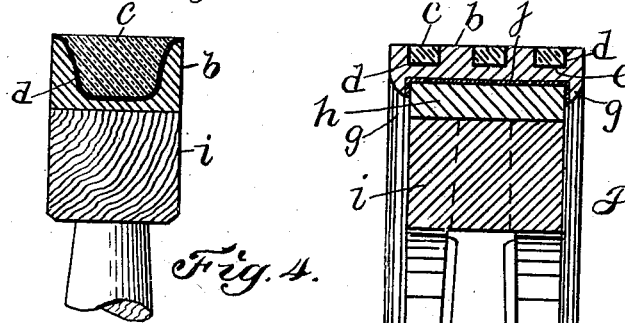

Figure 1 is an elevation of one form of wheel provided with a rim or tire embodying this invention; Fig. 2, a developed view of one section of the rim or tire shown in Fig. 1; Fig. 3, a detail in section and on an enlarged scale, to be referred to; and Fig. 4, a modification, to be referred to.

The wheel $a$ may be of any suitable or usual construction, and as herein represented is provided with a composite metal tire or rim, which may be made in sections, as shown, or which may be made in a single piece. In the present instance I have represented the composite metal rim or tire as composed of four sections, each of which comprises a casting $b$, of iron or steel, and one or more gripping-surfaces $c$, composed of softer metal—such as lead, tin, zinc, or their alloys—which are molecularly united to the iron and steel casting.

The molecular union referred to is represented in Figs. 2 and 3 by the heavy black line $d$, and this union may be effected in a manner similar to that now practiced in tinning iron or steel—namely, the iron or steel casting $b$ is made with one or more channels, recesses, or sockets $e$, (herein shown in Figs. 2 and 3 as three in number)—and after the said casting is cleansed and fluxed in the usual manner—as, for instance, by first dipping the casting in acid, such as sulfuric or hydrochloric, and then in a solution of chlorid of zinc—molten lead or like metal is poured into the said cavities or recesses until it is substantially flush with the outer surface of the casting. The union of the lead or other gripping metal with the iron or steel is such that the two metals are practically one.

The composite tire or section of a tire may be secured to the periphery of the wheel $a$ by bolts $f$ or in any other suitable manner, and to relieve said bolts from shearing strain means are provided for preventing lateral movement of the composite tire, which means are shown in the present instance as lips or flanges $g$ on opposite sides of the iron or steel portion of the tire. (See Fig. 3.)

The channels, sockets, or cavities $e$ in the iron or steel portion of the composite tire may be straight or of other shape, and they may be connected together or independent of one another. So, also, if desired, the iron or steel portion of the composite rim or tire may be provided with a single groove, channel, or recess of substantially the width of the tire or rim, which is filled with lead, zinc, &c., molecularly united to the iron or steel, as indicated in Fig. 4. The construction shown in Fig. 4 is more particularly designed for wheels employed on light vehicles.

The composite rim or tire may be applied to the wheels of vehicles now in use, in which case it is fitted over the usual flat iron or steel band $h$, or it may be applied directly to the wooden rim $i$ of the wheel. So, also, I may employ a layer $j$ of lead, zinc, tin, or like material between the composite rim and the iron or steel band $h$, if the latter is used, or between the composite tire and the wooden rim $i$, if the steel band $h$ is omitted.

The metal layer $j$ acts as a bed to receive the rough casting and thereby obtain a solid and uniform bearing for the composite tire. The space between the abutting ends of the tire or sections of the tire may be filled with lead, tin, zinc, or like metal, which is indicated in Fig. 1 by the heavy black line $k$.

By means of the molecular union between the lead or other softer metal and the iron or steel portion of the rim the said softer metal is firmly secured or fastened to said iron or steel portion, and is thus prevented from being worked out or displaced from the groove or channel by dirt, gravel, &c., with which it may come in contact in actual service.

I claim—

1. The combination with a wheel, of a composite tire or rim secured thereto and comprising an iron or steel portion having a channel, socket or recess in its outer surface, and a body of softer metal than said iron or steel, substantially filling the said channel, socket or recess and molecularly united to the iron or steel portion of the tire, substantially as described.

2. The combination with a wheel, of a composite tire or rim secured thereto and comprising an iron or steel portion having a channel, socket or recess in its outer surface, and provided with means for preventing lateral movement of the said tire, and a body of softer metal than said iron or steel substantially filling the said channel, socket or recess and molecularly united to the iron or steel portion, substantially as described.

3. The combination with a wheel, of a composite tire having its wearing-surface composed of iron or steel and a softer metal such as lead, tin, zinc and the like molecularly united to the iron or steel, substantially as described.

4. The combination with a wheel, of a composite tire having its wearing-surface composed of iron or steel and a softer metal such as lead, tin, zinc and the like molecularly united to the iron or steel, and a layer of cushioning material interposed between the composite tire and the rim of the wheel, substantially as described.

5. A composite metal tire for wheels, consisting of an iron or steel portion provided with a channel, recess or socket in its outer surface and a body or layer of softer metal, such as lead, tin, zinc and the like substantially filling the said channel, recess or socket and molecularly united to said iron or steel portion, substantially as described.

6. The combination with a wheel, of a composite tire secured thereto and comprising a plurality of sections, each of said sections consisting of an iron or steel casting having a channel, recess or socket in its outer surface, and a layer or body of softer metal, such as lead, tin, zinc, and the like, substantially filling said channel, recess or socket and molecularly united to the iron or steel casting, substantially as described.

In testimony whereof I have signed my name to this specification in the presence of two subscribing witnesses.

EDWARD I. BRADDOCK.

Witnesses:
JAS. H. CHURCHILL,
J. MURPHY.